(12) United States Patent
Deshmukh et al.

(10) Patent No.: US 11,983,946 B2
(45) Date of Patent: May 14, 2024

(54) REFINING ELEMENT ASSOCIATIONS FOR FORM STRUCTURE EXTRACTION

(71) Applicant: Adobe Inc., San Jose, CA (US)

(72) Inventors: Shripad Deshmukh, Solapur (IN);
Milan Aggarwal, Pitampura (IN);
Mausoom Sarkar, New Delhi (IN);
Hiresh Gupta, Shimla (IN)

(73) Assignee: Adobe Inc., San Jose, CA (US)

( * ) Notice: Subject to any disclaimer, the term of this patent is extended or adjusted under 35 U.S.C. 154(b) by 374 days.

(21) Appl. No.: 17/517,434

(22) Filed: Nov. 2, 2021

(65) Prior Publication Data

US 2023/0134460 A1 May 4, 2023

(51) Int. Cl.
*G06V 30/414* (2022.01)
*G06F 18/21* (2023.01)
*G06N 3/08* (2023.01)
*G06V 10/94* (2022.01)
*G06V 30/18* (2022.01)
*G06V 30/262* (2022.01)

(52) U.S. Cl.
CPC ............ *G06V 30/414* (2022.01); *G06F 18/21* (2023.01); *G06N 3/08* (2013.01); *G06V 10/95* (2022.01); *G06V 30/18* (2022.01); *G06V 30/274* (2022.01)

(58) Field of Classification Search
CPC .... G06V 30/18; G06V 30/274; G06V 30/414; G06V 10/95; G06N 3/08; G06F 18/21
See application file for complete search history.

(56) References Cited

U.S. PATENT DOCUMENTS

| 2017/0046622 A1* | 2/2017 | Gaither | G06F 40/247 |
| 2017/0075974 A1* | 3/2017 | Shetty | G06F 40/174 |
| 2019/0286691 A1* | 9/2019 | Sodhani | G06F 40/216 |

OTHER PUBLICATIONS

Alam, Hassan et al., "Web document manipulation for small screen devices: A review", Second International Workshop on Web Document Analysis [retrieved Sep. 2, 2021]. Retrieved from the Internet <https://intranet.csc.liv.ac.uk/research/other/wda2003/Papers/Section_II/Paper_8.pdf>., 2003, 4 Pages.

Audebert, Nicolas et al., "Multimodal deep networks for text and image-based document classification", Machine Learning and Knowledge Discovery in Databases [retrieved Sep. 2, 2021]. Retrieved from the Internet <https://www.irit.fr/pfia2019/wp-content/uploads/2019/07/Actes_CH_PFIA2019.pdf#page=14>., Mar. 28, 2020, 90 Pages.

(Continued)

*Primary Examiner* — Daniel G Mariam
(74) *Attorney, Agent, or Firm* — FIG. 1 Patents

(57) ABSTRACT

In implementations of refining element associations for form structure extraction, a computing device implements a structure system to receive estimate data describing estimated associations of elements included in a form and a digital image depicting the form. An image patch is extracted from the digital image, and the image patch depicts a pair of elements of the elements included in the form. The structure system encodes an indication of whether the pair of elements have an association of the estimated associations. An indication is generated that the pair of elements have a particular association based at least partially on the encoded indication, bounding boxes of the pair of elements, and text depicted in the image patch.

20 Claims, 14 Drawing Sheets

(56) References Cited

OTHER PUBLICATIONS

Bahdanau, Dzmitry et al., "Neural Machine Translation By Jointly Learning To Align And Translate", In Journal of Computing Research Repository [retrieved Sep. 2, 2021]. Retrieved from the Internet <https://www.cl.uni-heidelberg.de/courses/ws14/deep1/BahdanauETAL14.pdf>., Sep. 2014, 15 pages.

Bojanowski, Piotr et al., "Enriching Word Vectors with Subword Information", Transactions of the Association for Computational Linguistics vol. 5 [retrieved Sep. 2, 2021]. Retrieved from the Internet <https://research.fb.com/wp-content/uploads/2017/06/tacl.pdf>., Jun. 1, 2017, 12 Pages.

Chen, Liang-Chieh et al., "Encoder-Decoder with Atrous Separable Convolution for Semantic Image Segmentation", Computer Vision—ECCV 2018 [retrieved Sep. 3, 2021]. Retrieved from the Internet <https://www.florian-schroff.de/publications/chen_atrous_segmentation_v3.pdf>., Aug. 22, 2018, 18 pages.

Drivas, Dimitrios et al., "Page Segmentation and Classification Utilising A Bottom-Up Approach", Proceedings of the Third International Conference on Document Analysis and Recognition vol. 2 [retrieved Jan. 8, 2022]. Retrieved from the Internet <https://doi.org/10.1109/ICDAR.1995.601970>., Aug. 14, 1995, 5 pages.

Gupta, Aditya et al., "Mobile Web: Web Manipulation for Small Displays using Multi-level Hierarchy Page Segmentation", Proceedings of the 4th international conference on mobile technology, applications, and systems and the 1st international symposium on Computer human interaction in mobile technology. Retrieved from <https://doi.org/10.1145/1378063.1378163> on Sep. 3, 2021., Sep. 2007, 8 pages.

Ha, Jaekyu et al., "Document page decomposition by the bounding-box project", Proceedings of 3rd International Conference on Document Analysis and Recognition [retrieved Sep. 3, 2021]. Retrieved from the Internet <http://citeseerx.ist.psu.edu/viewdoc/download?doi=10.1.1.714.2103&rep=rep1&type=pdf>., Aug. 14, 1995, 5 Pages.

Ha, Jaekyu et al., "Recursive X-Y cut using bounding boxes of connected components", Proceedings of 3rd International Conference on Document Analysis and Recognition [retrieved Sep. 3, 2021]. Retrieved from the Internet <http://citeseerx.ist.psu.edu/viewdoc/download?doi=10.1.1.714.3113&rep=rep1&type=pdf>., Aug. 14, 1995, 4 Pages.

Hao, Leipeng et al., "A Table Detection Method for PDF Documents Based on Convolutional Neural Networks", 2016 12th IAPR Workshop on Document Analysis Systems (DAS) [retrieved Jan. 7, 2021]. Retrieved from the Internet <https://doi.org/10.1109/DAS.2016.23>., Apr. 11, 2016, 6 pages.

He, Dafang et al., "Multi-Scale Multi-Task FCN for Semantic Page Segmentation and Table Detection", 2017 14th IAPR International Conference on Document Analysis and Recognition (ICDAR) [retrieved Sep. 3, 2021]. Retrieved from the Internet <http://146.186.15.14/users/d/u/duh188/papers/ICDAR2017_DAFANG.pdf>., Nov. 20217, 8 Pages.

Hochreiter, Sepp et al., "Long Short-Term Memory", Neural Computation, vol. 9, No. 8 [retrieved Sep. 3, 2021]. Retrieved from the Internet <http://www.cs.cmu.edu/afs/cs/user/bhiksha/WWW/courses/deeplearning/Fall.2016/pdfs/Hochreiter97_lstm.pdf>., Nov. 15, 1997, 32 pages.

Howard, Andrew G. et al., "MobileNets: Efficient Convolutional Neural Networks for Mobile Vision Applications", Cornell University, arXiv Preprint, arXiv.org [retrieved Sep. 3, 2021]. Retrieved from the Internet <https://arxiv.org/pdf/1704.04861>., Apr. 2017, 9 Pages.

Huang, Zhiheng et al., "Bidirectional LSTM-CRF Models for Sequence Tagging", eprint arXiv:1508.01991 [retrieved Sep. 3, 2021]. Retrieved from the Internet <https://arxiv.org/pdf/1508.01991.pdf>., Aug. 2015, 10 Pages.

Katti, Anoop R. et al., "Chargrid: Towards Understanding 2D Documents", Proceedings of the 2018 Conference on Empirical Methods in Natural Language Processing [retrieved Sep. 3, 2021]. Retrieved from the Internet <https://aclanthology.org/D18-1476.pdf>., Oct. 2018, 11 Pages.

Khemakhem, Mohamed et al., "Enhancing Usability for Automatically Structuring Digitised Dictionaries", GLOBALEX workshop at LREC 2018 [retrieved Sep. 3, 2021]. Retrieved from the Internet <http://lrec-conf.org/workshops/lrec2018/W33/pdf/16_W33.pdf>., May 2018, 6 Pages.

Kingma, Diederik P. et al., "Adam: A Method for Stochastic Optimization", Cornell University, arXiv Preprint, arXiv.org [retrieved Sep. 16, 2021]. Retrieved from the Internet <https://arxiv.org/pdf/1412.6980.pdf>., Jan. 30, 2017, 15 pages.

Kölsch, Andreas et al., "Recognizing Challenging Handwritten Annotations with Fully Convolutional Networks", 2018 16th International Conference on Frontiers in Handwriting Recognition (ICFHR) [retrieved Sep. 3, 2021]. Retrieved from the Internet <https://arxiv.org/pdf/1804.00236v1.pdf>., Aug. 2018, 6 Pages.

Lebourgeois, Frank et al., "A fast and efficient method for extracting text paragraphs and graphics from unconstrained documents", 11th IAPR International Conference on Pattern Recognition, vol. 2 [retrieved Sep. 3, 2021]. Retrieved from the Internet <DOI:10.1109/ICPR.1992.201771>, 1992, 6 Pages.

Liu, Xiaojing et al., "Graph Convolution for Multimodal Information Extraction from Visually Rich Documents", arXiv:1903.11279 [retrieved Sep. 3, 2021]. Retrieved from the Internet <https://aclanthology.org/N19-2005.pdf>., Mar. 2019, 8 Pages.

Long, Jonathan et al., "Fully Convolutional Networks for Semantic Segmentation", arXiv Preprint [retrieved Sep. 3, 2021]. Retrieved from the Internet <https://arxiv.org/pdf/1411.4038.pdf>., Nov. 14, 2014, 10 pages.

Qasim, Shah R. et al., "Rethinking Table Recognition using Graph Neural Networks", arXiv: 1905.13391 [retrieved Sep. 3, 2021]. Retrieved from the Internet <https://arxiv.org/pdf/1905.13391.pdf>., 2019, 6 Pages.

Rahman, Fuad et al., "Conversion of PDF documents into HTML: a case study of document image analysis", The Thrity-Seventh Asilomar Conference on Signals, Systems & Computers [retrieved Jan. 8, 2022]. Retrieved from the Internet <https://doi.org/10.1109/ACSSC.2003.1291873>., Nov. 2003, 5 pages.

Riba, Pau et al., "Table Detection in Invoice Documents by Graph Neural Networks", 2019 International Conference on Document Analysis and Recognition (ICDAR) [retrieved Sep. 3, 2021]. Retrieved from the Internet <http://refbase.cvc.uab.es/files/RDG2019.pdf>., Sep. 2020, 6 Pages.

Sermanet, Pierre et al., "OverFeat: Integrated Recognition, Localization and Detection using Convolutional Networks", Courant Institute of Mathematical Sciences, New York University [retrieved Sep. 3, 2021]. Retrieved from the Internet <https://arxiv.org/pdf/1312.6229.pdf>., Feb. 24, 2014, 16 pages.

Sicre, Ronan et al., "Identity Documents Classification as an Image Classification Problem", Image Analysis and Processing—ICIAP 2017 [retrieved Sep. 3, 2021]. Retrieved from the Internet <https://hal.inria.fr/hal-01503541v1/document>., Apr. 11, 2017, 11 Pages.

Siegel, Noah et al., "Extracting Scientific Figures with Distantly Supervised Neural Networks", Proceedings of the 18th ACM/IEEE on Joint Conference on Digital Libraries [retrieved Sep. 3, 2021]. Retrieved from the Internet <https://arxiv.org/pdf/1804.02445.pdf>., May 23, 2018, 10 Pages.

Simonv, ANIKó et al., "A fast algorithm for bottom-up document layout analysis", IEEE Transactions on Pattern Analysis and Machine Intelligence, vol. 19, No. 3 [retrieved Jan. 8, 2022]. Retrieved from the Internet <https://doi.org/10.1109/34.584106>., Mar. 1997, 5 pages.

Sinha, Abhishek et al., "Attention Based Natural Language Grounding by Navigating Virtual Environment", 2019 IEEE Winter Conference on Applications of Computer Vision (WACV) [retrieved Sep. 3, 2021]. Retrieved from the Internet <https://arxiv.org/pdf/1804.08454.pdf>., Jan. 7, 2019, 9 Pages.

Sutskever, Ilya et al., "Sequence to Sequence Learning with Neural Networks", arXiv Preprint, arXiv.org [retrieved Sep. 3, 2021]. Retrieved from the Internet <https://arxiv.org/pdf/1409.3215.pdf>., Dec. 14, 2014, 9 pages.

(56) References Cited

OTHER PUBLICATIONS

Wick, Christoph et al., "Fully Convolutional Neural Networks for Page Segmentation of Historical Document Images", arXiv [retrieved Sep. 3, 2021]. Retrieved from the Internet <https://arxiv.org/pdf/1711.07695.pdf>., Nov. 2017, 6 Pages.

Wigington, Curtis et al., "Start, Follow, Read: End-to-End Full-Page Handwriting Recognition", Proceedings of the European Conference on Computer Vision (ECCV) [retrieved Sep. 3, 2021]. Retrieved from the Internet <https://openaccess.thecvf.com/content_ECCV_2018/papers/Curtis_Wigington_Start_Follow_Read_ECCV_2018_paper.pdf>., 2018, 17 Pages.

Williams, Ronald J. et al., "A Learning Algorithm for Continually Running Fully Recurrent Neural Networks", Neural Computation vol. 1, No. 2 [retrieved Sep. 3, 2021]. Retrieved from the Internet <http://citeseerx.ist.psu.edu/viewdoc/download?doi=10.1.1.52.9724&rep=rep1&type=pdf>., 1989, 10 Pages.

Yan, Zichao et al., "Hierarchical attention networks for document classification", Proceedings of the 2016 Conference of the North American Chapter of the Association for Computational Linguistics: Human Language Technologies [retrieved Sep. 15, 2021]. Retrieved from the Internet <https://aclanthology.org/N16-1174.pdf>., Jun. 2016, 10 Pages.

Yang, Xiao et al., "Learning to Extract Semantic Structure from Documents Using Multimodal Fully Convolutional Neural Networks", Proceedings of the IEEE Conference on Computer Vision and Pattern Recognition (CVPR) [retrieved Sep. 3, 2021]. Retrieved from the Internet <https://openaccess.thecvf.com/content_cvpr_2017/papers/Yang_Learning_to_Extract_CVPR_2017_paper.pdf>., Jun. 7, 2017, 10 pages.

\* cited by examiner

Fig. 3B

28. DOES THE VETERAN HAVE AN URE THROVAGINAL FISTULA?

☐ YES ☐ NO *(If yes, cause):*

*If yes, does the veteran have urine leakage?*

☐ YES ☐ NO

*If yes, check all that apply:*

☐ Does not require/does not use absorbent material
☐ Requires absorbent material that is changed less than 2 times per day
☐ Requires absorbent material that is changed 2 to 4 times per day
☐ Requires absorbent material that is changed more than 4 times per day
☐ Requires the use of an appliance

REFINING ELEMENT ASSOCIATIONS FOR FORM STRUCTURE EXTRACTION

BACKGROUND

A form is a paper or electronic document that is usable for collecting some type of information. For instance, forms typically include standard structures or elements such as checkboxes for providing binary (e.g., yes/no) information and text fields for providing textual information. These standard structures often appear in groups such as in choice groups which include multiple adjacent or nested choice fields having checkboxes for providing related binary information.

The process of automatically identifying structures included in a form is called form structure extraction. If these structures are accurately identified, then an extracted structure is usable to provide a variety of functionality such as digitizing a paper form or rendering the form as reflowable. Once rendered reflowable, the form is usable on display devices of computing devices having a variety of different form factors including display devices of mobile computing devices such as smartphones.

Conventional systems for automatically identifying structures included in forms are not able to accurately identify choice groups having adjacent or nested choice fields. This is because of the close proximity of the choice fields which causes conventional systems that identify structures based on a global context (e.g., the entire form) to incorrectly identify multiple choice groups as a single choice group. Similarly, this causes conventional systems that identify structures included in forms based on a local context (e.g., a small portion of the form) to incorrectly identify a single choice group as multiple different choice groups.

SUMMARY

Techniques and systems are described for refining element associations for form structure extraction. In an example, a computing device implements a structure system to receive estimate data describing estimated associations of elements included in a form and a digital image depicting the form. An image patch is extracted from the digital image. For instance, the image patch depicts a pair of elements of the elements included in the form.

The structure system encodes an indication of whether the pair of elements have an association of the estimated associations. An indication is generated that the pair of elements have a particular association based at least partially on the encoded indication, bounding boxes of the pair of elements, and text depicted in the image patch. For example, the indication is displayed in a user interface, used to digitize the form, used to make the form reflowable, and so forth.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIGS. 3A and 3B illustrate an example of generating estimate data.

FIGS. 8A, 8B, and 8C illustrate examples of structures extracted from forms.

DETAILED DESCRIPTION

Overview

Figure 1:
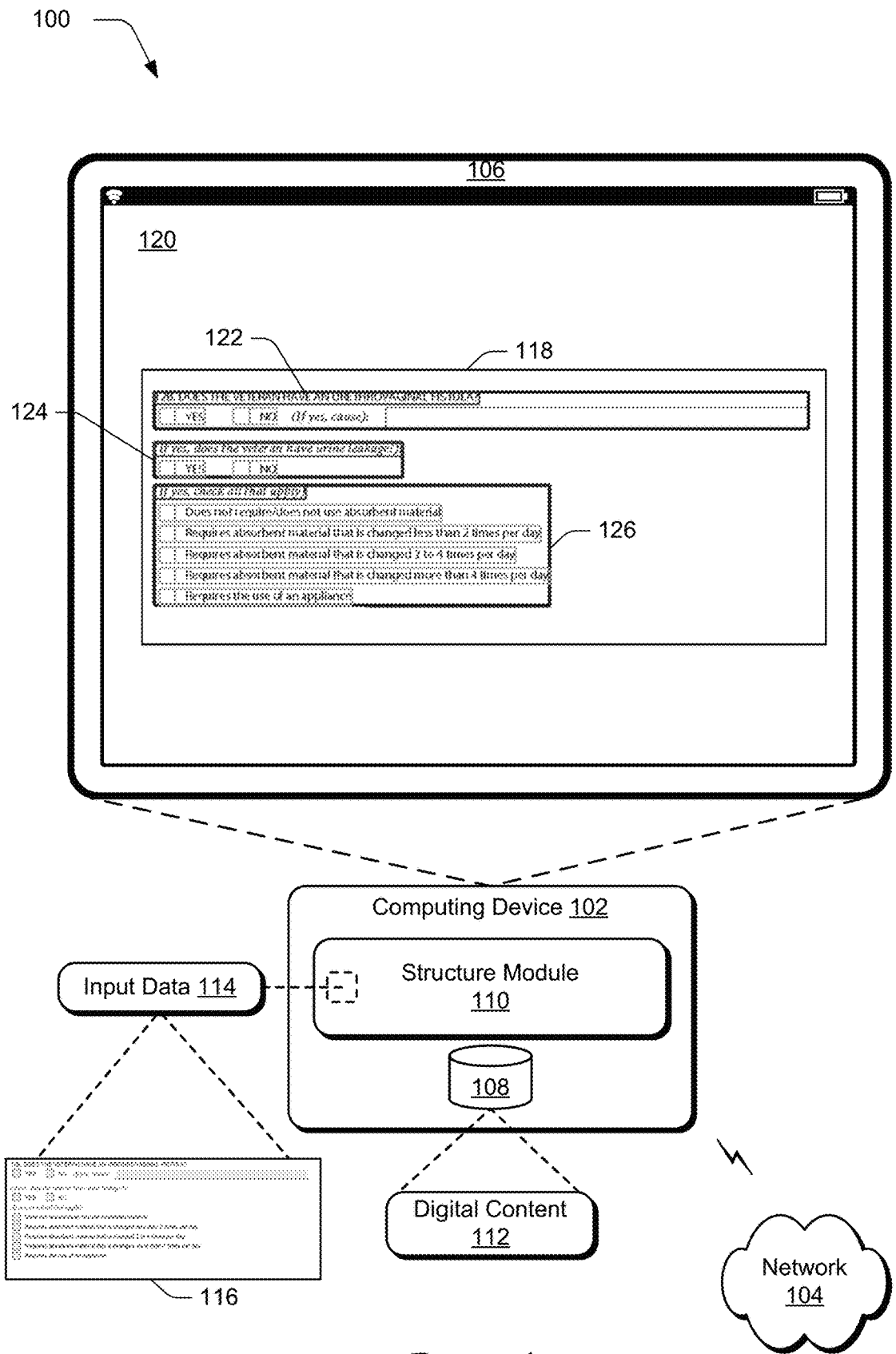
FIG. 1 is an illustration of an environment in an example implementation that is operable to employ digital systems and techniques for refining element associations for form structure extraction as described herein.

Conventional systems for automatically identifying structures included in forms are unable to accurately identify choice groups having adjacent or nested choice fields. A close proximity of the adjacent or nested choice fields within the choice groups causes conventional systems to incorrectly identify multiple different choice groups as a single choice group and to incorrectly identify a single choice group as multiple different choice groups. In order to overcome the limitations of conventional systems, techniques and systems are described for refining element associations for form structure extraction. In one example, a computing device implements a structure system to receive input data describing a digital image depicting a form.

The structure system generates estimate data describing estimated associations of elements included in the form by processing the input data using a hierarchical convolutional neural network trained on training data to receive an image depicting an input form as an input and generate indications of associations of elements included in the form as an output. For example, the hierarchical convolutional neural network classifies pixels included in the digital image as being part of a form structure or not part of a form structure. The hierarchical convolutional neural network outputs a mask for widgets, a mask for text blocks, and a mask for choice groups based on the input data.

The structure system uses the mask for widgets and the mask for text blocks to compile a list of widgets and text blocks included in the form. For instance, the structure system uses the mask for choice groups to determine a list of choice group identifiers that correspond to choice groups estimated to be included in the form. The list of widgets and text blocks is combined with the list of choice group identifiers as prior choice group information for a multimodal network.

The multimodal network includes convolutional encoders and a long short term memory based text encoder. The structure system processes the input data to extract image patches from the digital image depicting the form. The image patches depict a reference element and candidate elements in close proximity to the reference element. For example, the multimodal network processes a particular image patch to generate indications of whether or not a reference element depicted by the particular image patch is included in a choice group with each candidate element depicted by the particular image patch.

To do so, the structure system generates a visual embedding by processing the particular image patch with a convolutional encoder of the multimodal network. A textual embedding is generated by processing text extracted from the particular image patch using the long short term memory based text encoder. The textual embedding is combined with spatial information (e.g., bounding box information) for the elements depicted in the particular image patch and the prior choice group information for processing by a bidirectional long short term memory context encoder of the multimodal network. The bidirectional long short term memory context encoder generates a contextual embedding based on the textual embedding, the spatial information, and the prior choice group information.

The structure system combines the contextual embedding with the visual embedding for processing by long short term memory decoders of the multimodal network. These long short term memory decoders output a sequence of indications that each indicate whether the reference element and a candidate element are included in a same choice group of the form. The structure system refines the sequence of indications along with other sequences of indications based on other patch images to extract the choice groups from the form.

Once extracted, the structure of the form is usable to provide a variety of functionality such as digitizing the form or rendering the form as reflowable. For example, a reflowable form automatically changes orientation and/or resolution such the reflowable form is viewable and completable via interaction in a user interface of a mobile device such as a smartphone. By leveraging the choice group predictions of the hierarchical convolutional neural network as prior choice group information for the multimodal network, the described systems are capable of identifying choice groups included in forms with greater accuracy than both the hierarchical convolutional neural network and the multimodal network. In one example, this improves accuracy of choice group identification by more than 15 percent relative to conventional systems which is a technological improvement in the technical field of form structure extraction.

Term Examples

As used herein, the term "widget" refers to a field included in a form that is either checkable or populatable with text. By way of example, a checkbox is a widget and a textbox is a widget.

As used herein, the term "text run" refers to a single continuous line of text in a form.

As used herein, the term "text block" refers to a group of two or more text runs in a form.

As used herein, the term "text field" refers to a combination of a text run or text block (e.g., a caption) and a widget (e.g., a text box) in a form. By way of example, a text field includes a text block caption indicating information to provide in a widget which is a text box.

As used herein, the term "choice field" refers to a combination of a text run or text block (e.g., a caption) and a widget (e.g., a checkbox) in a form. By way of example, a choice field includes a text block caption indicating binary information (e.g., yes or no) to provide in a widget which is a checkbox.

As used herein, the term "choice group" refers to a combination of a text run or text block (e.g., a title) and two or more choice fields in a form. By way of example, a choice group is a group of related choice fields. By way of further example, some choice groups include a text field and some choice groups do not include a text field.

As used herein, the term "association" refers to a relationship between elements included in a form. By way of example, a first widget and a second widget share an association if the first widget and the second widget are included in a same choice group of a form.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and a structure module 110. The storage device 108 is illustrated to include digital content 112 such as electronic forms, electronic documents, digital images, digital videos, etc.

The structure module 110 is illustrated as having, receiving, and/or transmitting input data 114. As shown, the input data 114 describes a digital image 116 depicting a form. For example, the form is a legacy form which was used as part of a paper-based system for collecting, processing, and maintaining information. In another example, the form is an electronic form that was created for use (e.g., viewing, completing, etc.) relative to a display device of a computing device having a relatively large display area. In this example, the form is difficult to view and impossible (or nearly impossible) to complete using a mobile device such as a smartphone.

In order to convert the form into an electronic form that is reflowable (e.g., automatically adaptable to variously sized display areas of display devices), the computing device 102 implements the structure module 110 to extract a structure of the form. To do so, the structure module 110 processes the input data 114 to identify elements or structures such as widgets, text runs, text blocks, text fields, choice fields, choice groups, and/or choice group titles included in the form. The widgets are checkboxes or textboxes and the text runs are single lines of text included in the form. The text blocks are groups of text runs and the text fields are combinations of captions and textboxes. Similarly, the choice fields are combinations of captions and checkboxes. Finally, the choice groups are groups of two or more choice fields.

For example, the structure module 110 identifies the elements or structures included in the form by processing the digital image 116 using a hierarchical convolutional neural network trained on training data to classify pixels of digital images as being part of a form structure or not being part of a form structure. The hierarchical convolutional neural network receives the digital image 116 as an input and generates outputs that include a mask for widgets, a mask for text runs, a mask for text blocks, a mask for text fields, a mask for choice fields, a mask for choice groups, and a mask for choice group titles. For instance, the hierarchical convolutional neural network is capable of classifying lower level elements included in the form such as widgets and text blocks with high precision and recall (e.g., greater than 85 percent).

However, the hierarchical convolutional neural network classifies higher level elements included in the form such as choice groups with lower precision and recall (e.g., less than 65 percent). This is because higher level elements are frequently nested (e.g., include structures within structures within other structures). As a result of this nesting, pixels included in a lower level structure of the form which is part of a higher level structure of the form are also included in the higher level structure. Accordingly, it is challenging for the hierarchical convolutional neural network to distinguish between the higher level structure and the lower level structure that is included in the higher level structure.

In order to identify higher level elements or structures included in the form depicted by the digital image 116 with greater recall and precision, the structure module 110 leverages a multimodal network that includes long short term memory encoders and long short term memory decoders to process the input data 114 based at least partially on an output from the hierarchical convolutional neural network. For example, the structure module 110 uses the mask for the widgets and the mask for the text blocks generated by the hierarchical convolutional neural network to compile a list of widgets and text blocks included in the form. For instance, the structure module 110 uses the mask for the choice groups generated by the hierarchical convolutional neural network to determine a list of choice group identifiers that correspond to choice groups estimated to be included in the form.

The list of widgets and text blocks is combined with the list of choice group identifiers as prior choice group information for the multimodal network. For example, the structure module 110 also processes the input data 114 using the multimodal network by extracting image patches from the digital image 116. Each image patch depicts a reference element and candidate elements included in the form.

The structure module 110 generates a patch sequence by organizing candidate elements depicted in a particular image patch according to a reading order (e.g., left to right and top to bottom). Additionally, visual embeddings are generated by processing the particular image patch (and other image patches) using a convolutional encoder of the multimodal network. Text depicted by the particular image patch is encoded using a long short term memory encoder to generate a textual embedding.

The textual embedding along with spatial information for each element included in the particular image patch is processed using a bidirectional long short term memory context encoder of the multimodal network to generate a contextual embedding for each of the elements included in the particular image patch. For instance, the contextual embeddings are augmented with the visual embeddings along with the prior choice group information to generate an overall embedding for each of the candidate elements and the reference element. These overall embeddings are processed using a long short term memory decoder of the multimodal network which outputs an indication of whether a particular candidate element is included in a same choice group as the reference element in the form.

A sequence of such indications is produced and then further refined to extract the choice groups out of the form. Once extracted, the structure module uses the structure of the form to generate indications 118 of associations between elements included in the form which are rendered in a user interface 120 of the display device 106. As shown, the indications 118 include choice groups 122-126. For instance, the choice group 122 includes two choice fields and a text field and the choice group 124 includes two choice fields. The choice group 126 includes five choice fields.

For example, the hierarchical convolutional neural network only identified a single choice group in the form instead of the three choice groups 122-126. However, by leveraging the prior choice group information, the multimodal network is capable of extracting the structure from the form with greater precision and recall (e.g., around 70 percent). Consider an example in which the multimodal network processes the input data 114 to extract the structure of the form without using the prior choice group information. In this example, the multimodal network fails to accurately identify the three choice groups 122-126 because the multimodal network processes the image patches extracted from the digital image 116 to extract the structure of the form.

The image patches only include elements of the form that are in close proximity and the multimodal network fails to accurately identify the three choice groups 122-126 because the image patches are limited to consideration of elements depicted in the image patches. For example, a first image patch includes a portion of the choice group 126 and a second image patch includes another portion of the choice group 126. Based on these portions, the multimodal network identifies the choice group 126 as two different choice groups. Accordingly, by leveraging the hierarchical convolutional neural network and the multimodal network, the structure module 110 identifies the choice groups 122-126 with greater accuracy than is possible to achieve using either of the two networks alone.

Figure 2:
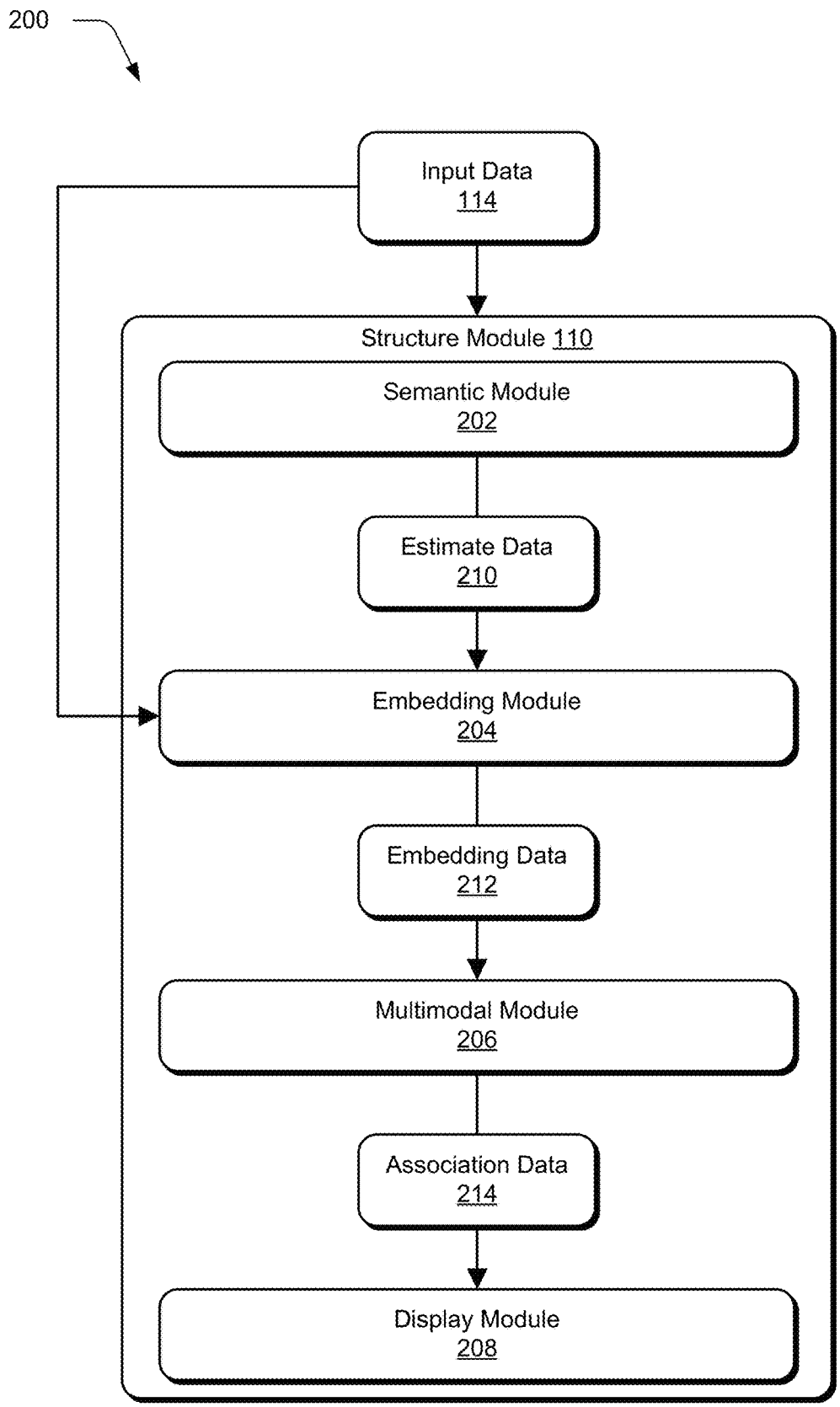
FIG. 2 depicts a system in an example implementation showing operation of a structure module for refining element associations for form structure extraction.

FIG. 2 depicts a system 200 in an example implementation showing operation of a structure module 110. The structure module 110 is illustrated to include a semantic module 202, an embedding module 204, a multimodal module 206, and a display module 208. The structure module 110 receives the input data 114 and processes the input data 114 to generate estimate data 210.

Figure 3A:
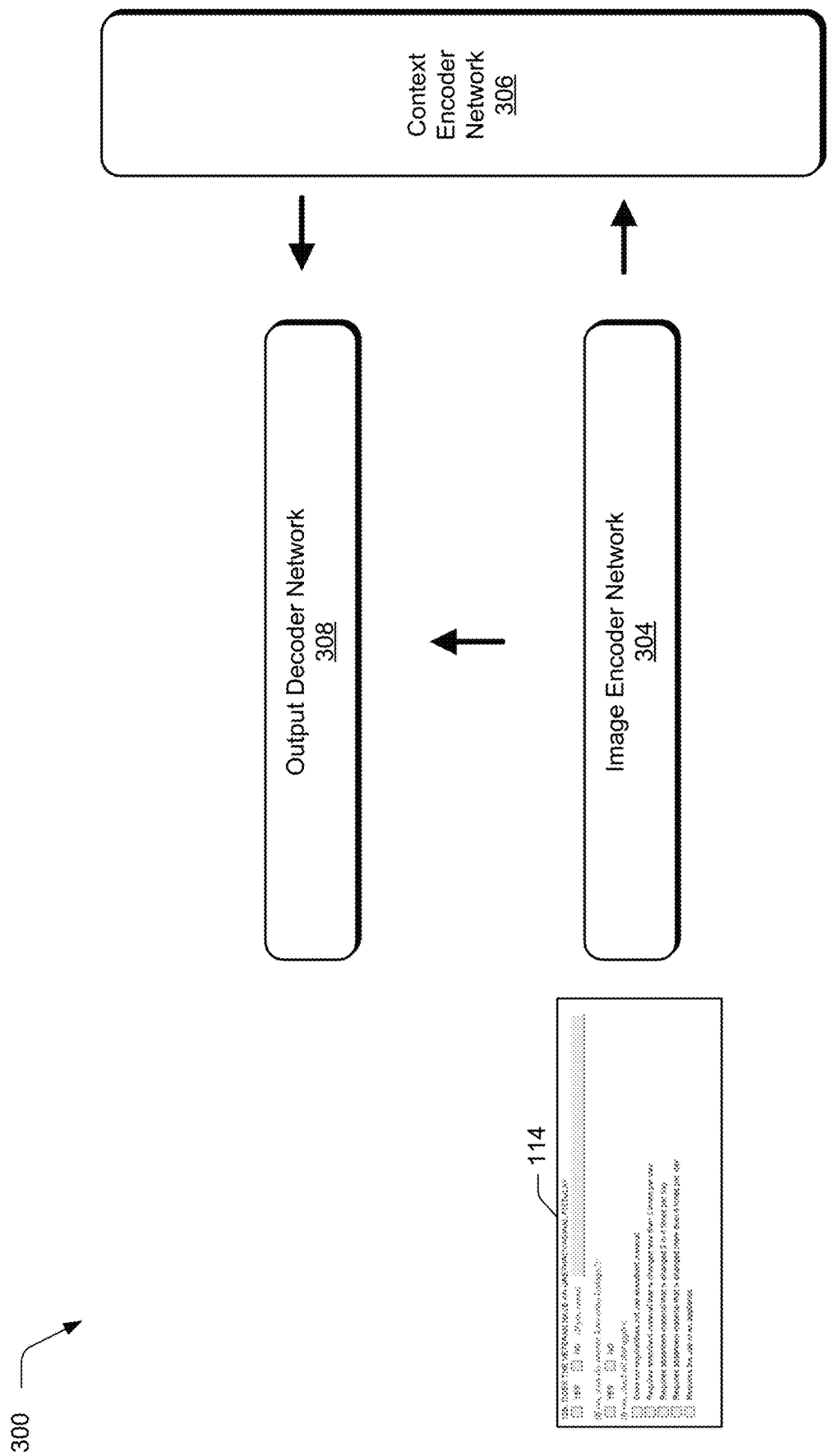

FIGS. 3A and 3B illustrate an example of generating estimate data. FIG. 3A illustrates a representation 300 of a hierarchical convolutional neural network. FIG. 3B illustrates a representation 302 of estimate data 210. In one example, the semantic module 202 includes a hierarchical convolutional neural network as described by Sakar et al., *Document Structure Extraction using Prior based High Resolution Hierarchical Semantic Segmentation*, arXiv: 1911.12170v2 [cs.CV] (Sep. 17, 2020). As shown in FIG. 3A, the input data 114 describes a digital image depicting a form. For example, the semantic module 202 includes a hierarchical convolutional neural network having an image encoder network 304.

For instance, the hierarchical convolutional neural network is trained on training data to receive a digital image depicting an input form as an input and generate indication of associations of elements included in the input form as an output. The image encoder network 304 processes the input data 114 to encode image features for a context encoder network 306 of the hierarchical convolutional neural network. In an example, image encoder network 304 includes multiple convolutional layers and max-pooling layers.

The context encoder network 306 receives and processes the encoded image features. For example, the context encoder network 306 includes four bidirectional 1D dilated convolutional blocks. An output decoder network 308 of the hierarchical convolutional neural network receives and processes an output from the context encoder network 306 to generate the estimate data 210. For instance, the output decoder network 308 includes an output decoder with seven output heads that each generate a segmentation mask for the digital image depicting the form. For example, the output decoder network 308 generates a mask for widgets, a mask for text runs, a mask for text blocks, a mask for text fields, a mask for choice fields, a mask for choice group titles, a mask for choice groups, and so forth.

With reference to FIG. 3B, the semantic module 202 uses the segmentation masks to generate the estimate data 210 as describing estimated associations between elements included in the form that is depicted in the digital image described by the input data 114. As shown, the estimate data 210 describes a single choice group 310 as being included in the form. As illustrated in FIG. 2, the embedding module 204 receives the estimate data 210 and the input data 114, and the embedding module 204 processes the estimate data 210 and/or the input data 114 to generate embedding data 212.

Figure 4A:
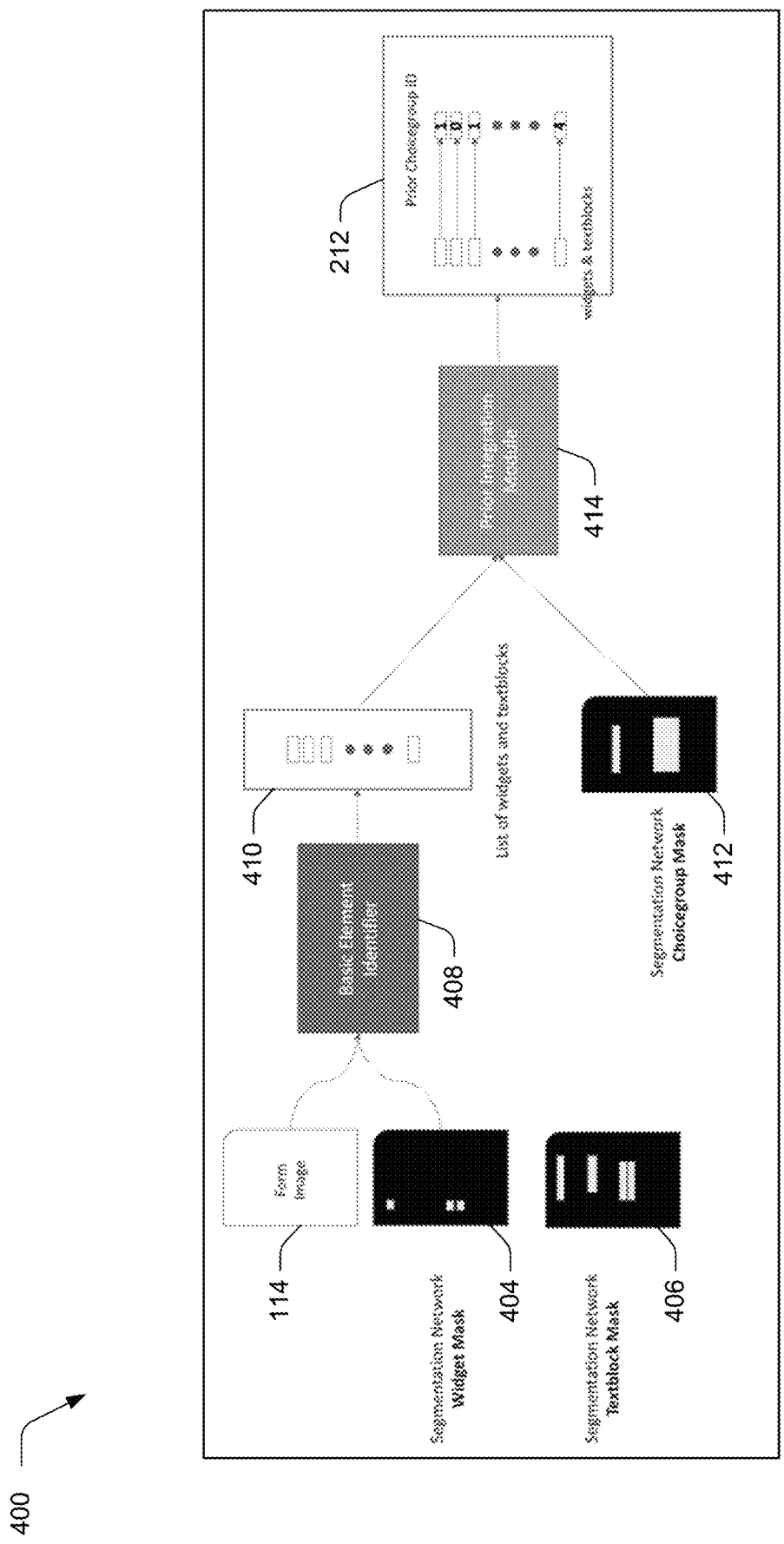
FIGS. 4A and 4B illustrate an example of generating embedding data.
Figure 4B:
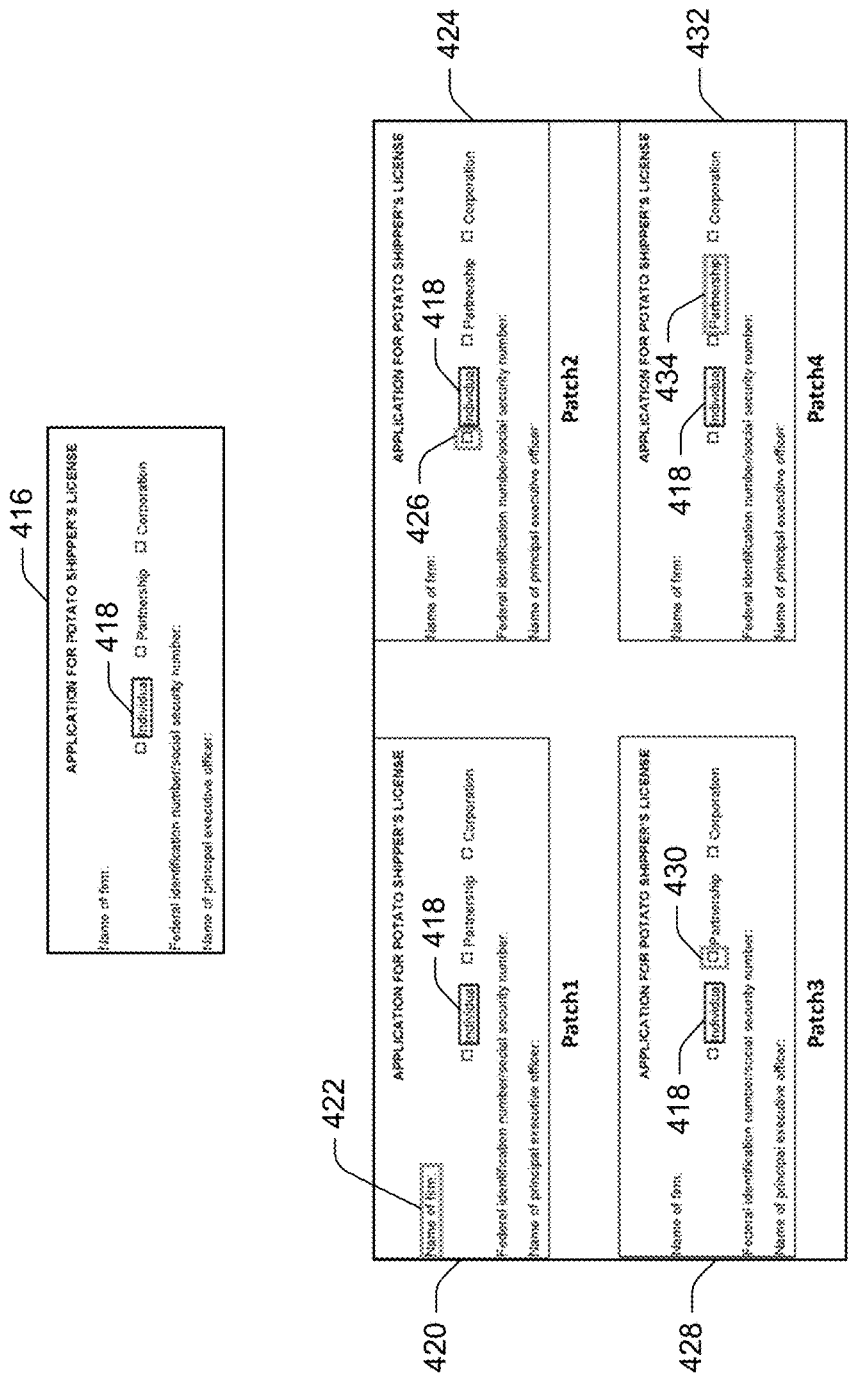

FIGS. 4A and 4B illustrate an example of generating embedding data. FIG. 4A illustrates a representation 400 of using segmentation masks generated by the hierarchical convolutional neural network to generate prior choice group information for the multimodal network. FIG. 4B illustrates a representation 402 of extracting image patches from the digital image of the form described by the input data 114 for the multimodal network.

The representation 400 includes a widget mask 404 and a text block mask 406. For example, the embedding module 204 uses the widget mask 404 to extract a list of widgets included in the form and the embedding module 204 uses the text block mask 406 to extract a list of text blocks included in the form. This is illustrated as a basic element identifier 408 which combines the extracted widgets and the extracted text blocks as a list of widgets and text blocks 410.

As shown, the representation 400 also includes a choice group mask 412 and the embedding module 204 uses the choice group mask 412 to extract a list of choice groups included in the form that includes choice group identifiers associated with the choice groups. The embedding module 204 combines the list of choice groups with the list of widgets and text blocks 410 using a prior integration module 414 to generate the prior choice group information which associates the widgets and the text blocks with the choice group identifiers. For instance, the prior choice group information is illustrated to be included in the embedding data 212.

In an example, the embedding module 204 also extracts image patches from the digital image depicting the form for processing using the multimodal network. With respect to FIG. 4B, the representation 402 includes an image patch 416 depicting a reference element 418 and neighboring candidate elements. For instance, the reference element 418 is "Individual."

The embedding module 204 organizes the candidate elements in reading order (e.g., left to right and top to bottom) and generates additional image patches that each highlight a neighboring candidate element in the reading order. As shown, the embedding module 204 generates image patch 420 as indicating candidate element 422 which is "Name of firm:" and also generates image patch 424 as indicating candidate element 426 which is a widget that is a checkbox. The embedding module 204 generates image patch 428 as indicating candidate element 430 which is also a widget that is a checkbox.

Finally, the embedding module 204 generates image patch 432 as indicating candidate element 434 which is "Partnership." For each of the image patches 420, 424, 428, 432, the embedding module 204 extracts text depicted by the image patches 420, 424, 428, 432. The embedding module 204 also extracts bounding box information from the image patches 420, 424, 428, 432 for the reference element 418 and the candidate elements 422, 426, 430, 434. The embedding module 204 generates the embedding data 212 as describing the prior choice group information, the image patches 420, 424, 428, 432, the extracted text, and the extracted bounding box information.

Figure 5A:
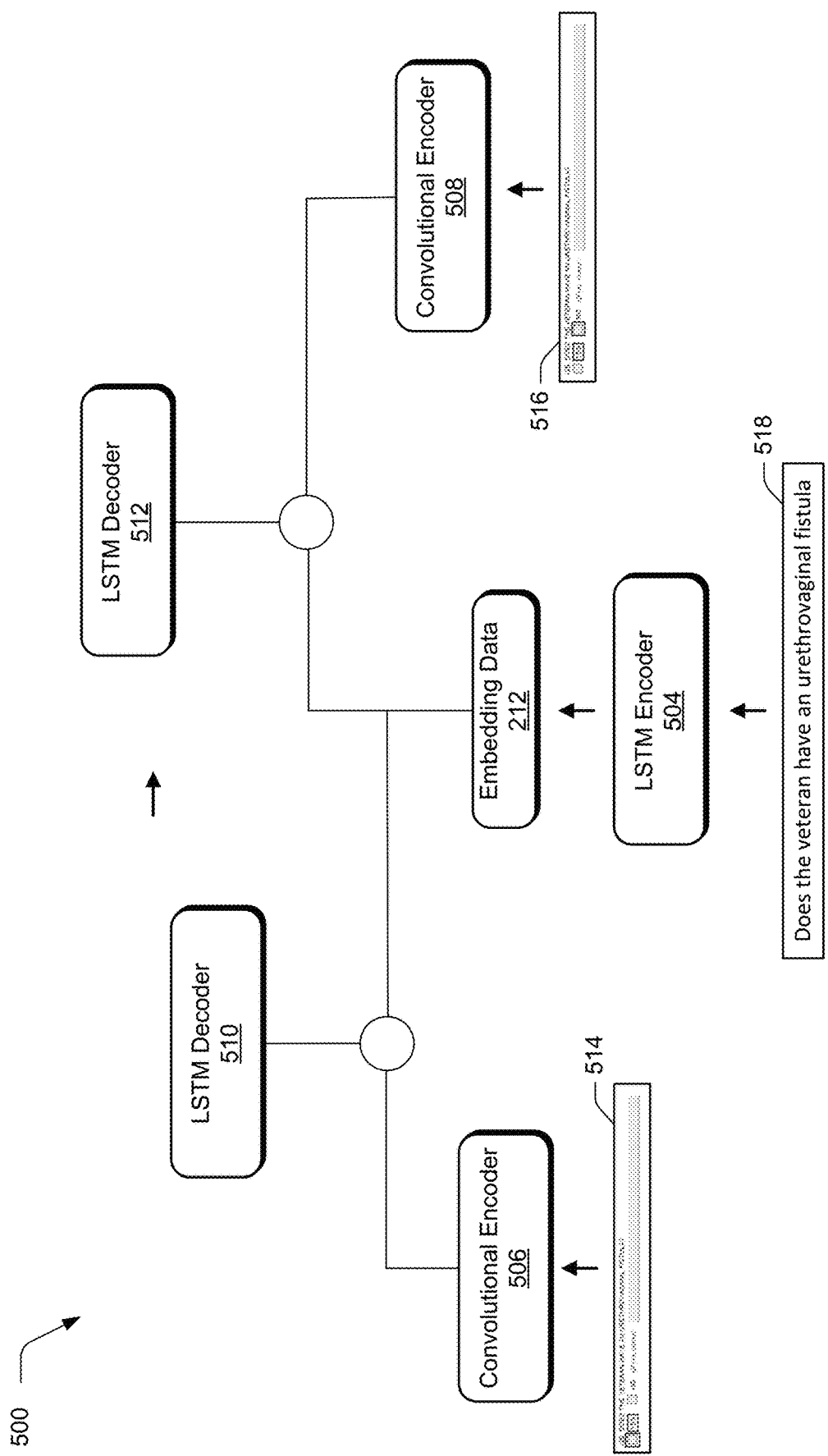
FIGS. 5A and 5B illustrate an example of form structure extraction.
Figure 5B:
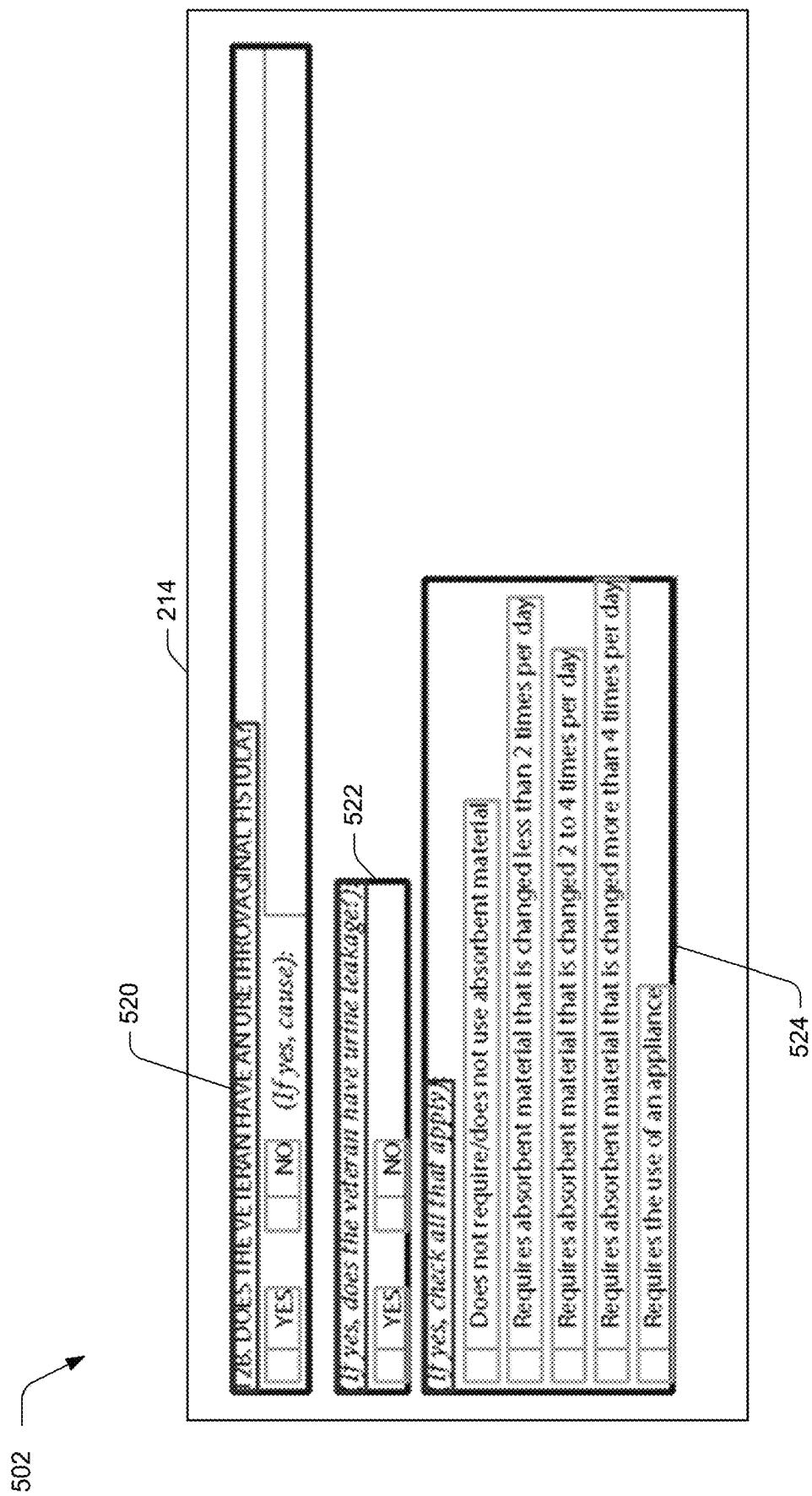

With reference to FIG. 2, the multimodal module 206 receives the embedding data 212 and processes the embedding data 212 to generate association data 214. FIGS. 5A and 5B illustrate an example of form structure extraction. FIG. 5A illustrates a representation 500 of a multimodal network. FIG. 5B illustrates a representation 502 of an extracted structure from the form. As shown in the representation 500, the multimodal network is illustrated as having, receiving, and/or transmitting the embedding data 212. In one example, the multimodal network is a network as described by Aggarwal et al., Multi-Modal Association based Grouping for Form Structure Extraction, Proceedings of the IEEE/CVF Winter Conference on Applications of Computer Vision, pp. 2075-2084 (2020).

The multimodal network includes a long short term memory encoder 504, a convolutional encoder 506, a convolutional encoder 508, a long short term memory decoder 510, and a long short term memory decoder 512. The convolutional encoder 506 processes an image patch 514 to generate visual embeddings. Similarly, the convolutional encoder 508 processes an image patch 516 to generate visual embeddings. For instance, the long short term memory encoder 504 processes extracted text 518 from the image patches 514, 516 to generate a textual embedding.

The textual embedding, the prior choice group information, and spatial information for each element in the image patches 514, 516 (e.g., the extracted bounding box information described by the embedding data 212) is processed by a bidirectional long short term memory based context encoder to generate contextual embeddings. In one example, the bidirectional long short term memory based context encoder generates a contextual embedding for each element in the image patches 514, 516. The contextual embeddings are augmented with the visual embeddings to generate an overall embedding for each <reference, candidate> pair of elements included in the image patches 514, 516.

A sequence of the overall embeddings is processed by the long short term memory decoder 510 and the long short term memory decoder 512 which outputs an indication of whether a corresponding <reference, candidate> pair of elements belong to a same choice group or not. For example, this yes/no output sequence is further refined to extract choice groups out of the form. For instance, the multimodal module 206 generates the association data 214 as describing the extracted choice groups.

As shown in FIG. 5B, the association data 214 describes the form as having three choice groups 520-524. Recall the estimate data 210 described the form as having the single choice group 310 which is described instead as the three choice groups 520-524 by the association data 214. The reason for this is because the hierarchical convolutional neural network classifies pixels of the digital image depicting the form as either being part of a <form structure> or not, and the <form structure> is a widget, a text run, a text block, a text field, a choice field, a choice group title, or a choice group.

Because the hierarchical convolutional neural network classifies pixels in this manner, it is difficult for the hierarchical convolutional neural network to distinguish between choice groups that are adjacent or nested. This difficulty is illustrated by the classification of the single choice group 310 which is really the three choice groups 520-524 that are adjacent. However, by leveraging the hierarchical convolutional neural network to generate the embedding data 212, the multimodal module 206 is capable of accurately identifying the three choice groups 520-524 that are adjacent. In an example, this is representable as:

$$f_\theta(x) = \{wi, tr, tb, tf, cf, chgp\}$$

where: $f_\theta$ represents the hierarchical convolutional neural network; x represents a digital image depicting a form; wi represents a list of widgets included in the form; tr represents a list of text runs included in the form; tb represents a list of text blocks included in the form; tf represents a list of text fields included in the form; cf represents a list of choice fields included in the form; and chgp represents a list of choice groups included in the form.

A list of basic elements is representable as:

$$wi \cup tb = \{e_1, e_2, e_3, \ldots, e_{n_w + n_t}\}$$

where: $wi \cup tb$ represents the list of basic elements; $n_w$ represents a number of widgets included in the form; and $n_t$ represents a number of text blocks included in the form.

A reference element is selected from the list and its index is $i \in \{1, 2, 3, \ldots, n_w + n_t\}$. Candidate elements k are chosen to determine whether they are in a same choice group as the reference element. A patch sequence (e.g., extracted from image patches) corresponding to these elements is defined as $\{p_{i-i_1}, p_{i-i_2}, p_{i-i_3}, p_{i-i_4}, \ldots, p_{i-i_k}\}$. Textual information (e.g., depicted in image patches) for each of these elements is defined as $\{t_{i_1}, t_{i_2}, t_{i_3}, \ldots, t_{i_k}\}$. Spatial information (e.g., bounding boxes of elements depicted in image patches) for each of these elements is defined as $\{b_{i_1}, b_{i_2}, b_{i_3}, \ldots, b_{i_k}\}$.

The multimodal network $g_\phi$ receives the patch sequence, the textual information, and the spatial information as an input and outputs a sequence based on the input that is representable as:

$$\{I_{i-i_1}, I_{i-i_2}, \ldots, I_{i-i_k}\}$$

where: $I_{i-j}$ is an indicator which is equal to 1 when i and j belong to a same choice group and 0 otherwise.

For example, before integration of the prior choice group information, the inputs and outputs of the multimodal network $g_\phi$ are representable as:

$$g_\phi\left(\{p_{i-i_j}\}_{j=1}^{j=k}, \{t_{i_j}\}_{j=1}^{j=k}, \{b_{i_j}\}_{j=1}^{j=k}\right) = \{I_{i-i_j}\}_{j=1}^{j=k}$$

The multimodal network parameters $\phi$ are optimized for form structure extraction and after integration of the prior choice group information, the inputs and outputs of the multimodal network $g_\phi$ are representable as:

$$g_\phi\left(\{p_{i-i_j}\}_{j=1}^{j=k}, \{t_{i_j}\}_{j=1}^{j=k}, \{b_{i_j}\}_{j=1}^{j=k} \mid \{I_{i-i_j, segmentation}\}_{j=1}^{j=k}\right) = \{I_{i-i_j}\}_{j=1}^{j=k}$$

where: $\{I_{i-i_j, segmentation}\}_{j=1}^{j=k}$ is equal to 1 when the hierarchical convolutional neural network predicts that elements i and $i_j$ belong to a same choice group (e.g., are contained in a same choice group bounding box) and 0 otherwise.

Figure 6:
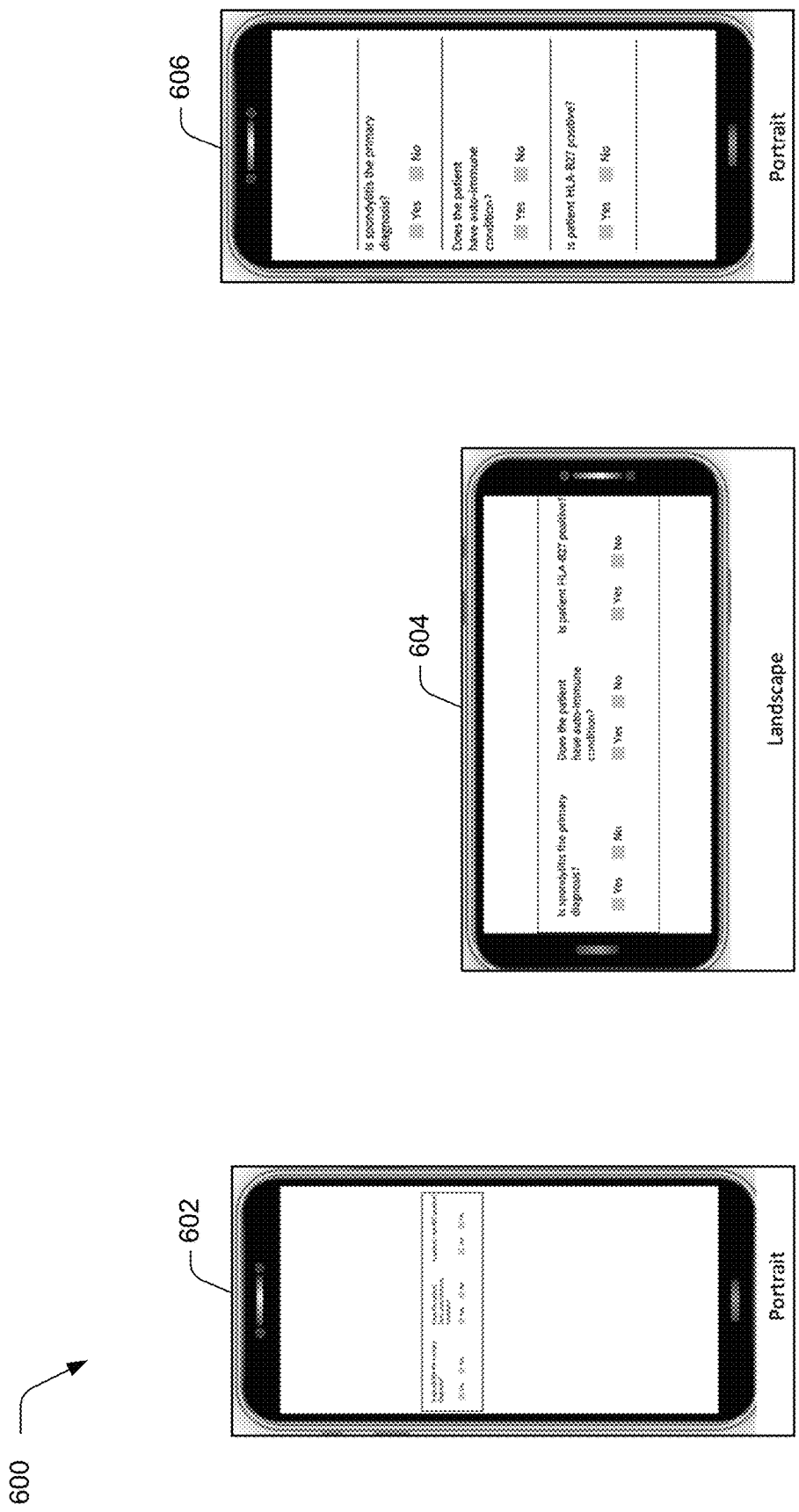
FIG. 6 illustrates a representation of leveraging an extracted form structure to display the form on a display device of a mobile computing device.

With reference to FIG. 2, the display module 208 receives the association data 214 and processes the association data 214 to display a version of the form as an electronic form that is reflowable (e.g., automatically adaptable to variously sized display areas of display devices). FIG. 6 illustrates a representation 600 of leveraging an extracted form structure to display the form on a display device of a mobile computing device. The representation 600 includes a first example 602 in which the form is displayed on the display device of the mobile computing device without leveraging the extracted form structure. The form includes three choice groups which are adjacent. As shown in the first example 602, the form is difficult to read and impossible (or practically impossible) to complete via interaction with the display device of the mobile computing device. For example, a user interacts with the display device relative to the widget checkboxes of one of the choice groups to check a checkbox indicating "Yes." In a first example, this interaction fails to check the checkbox indicating "Yes." In a second example, this interaction checks a checkbox indicating "No."

The representation 600 also includes a second example 604 in which the extracted form structure is leveraged to display the form based on a landscape orientation of the mobile computing device. As illustrated in the second example 604, the form is easily readable and easily completable via interaction with the display device of the mobile computing device. For example, the user interacts with the display device relative to the widget checkboxes of one of the choice groups to check the checkbox indicating "Yes" and this interaction successfully checks the checkbox.

In a third example 606, the extracted form structure is leveraged to display the form based on a portrait orientation of the mobile computing device. As shown, the form is easily readable and easily completable via interaction with the display device of the mobile computing device. For instance, the three choice groups are displayed adjacently and in a reading order as in the second example 604 in which a reading order is left to right. By leveraging the extracted form structure, the displayed reading order in the third example 606 is top to bottom based on the portrait orientation of the mobile computing device.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 7:
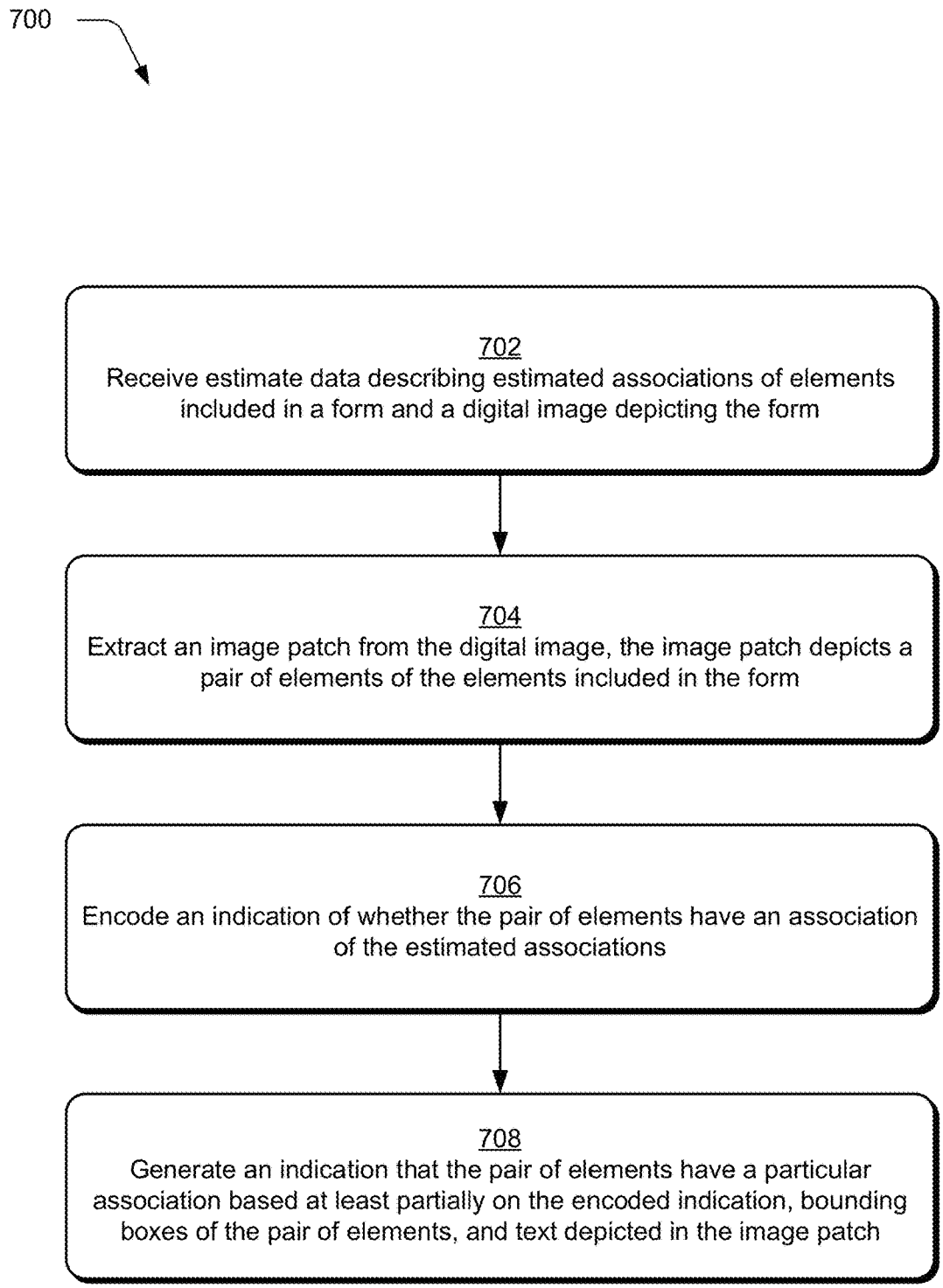
FIG. 7 is a flow diagram depicting a procedure in an example implementation in which an indication is generated that a pair of elements included in a form have a particular association.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-6. FIG. 7 is a flow diagram depicting a procedure 700 in an example implementation in which an indication is generated that a pair of elements included in a form have a particular association.

Estimate data is received describing estimated associations of elements included in a form and a digital image depicting the form (block 702). For example, the computing device 102 implements the structure module 110 to receive the estimate data. An image patch is extracted from the digital image (block 704), the image patch depicts a pair of elements of the elements included in the form. The structure module 110 extracts the image patch from the digital image in one example.

An indication of whether the pair of elements have an association of the estimated associations is encoded (block 706). In an example, the structure module 110 encodes the indication of whether the pair of elements have the association of the estimated associations. An indication is generated (block 708) that the pair of elements have a particular association based at least partially on the encoded indication, bounding boxes of the pair of elements, and text depicted in the image patch. For example, the structure module 110 generates the indication that the pair of elements have the particular association.

Figure 8A:
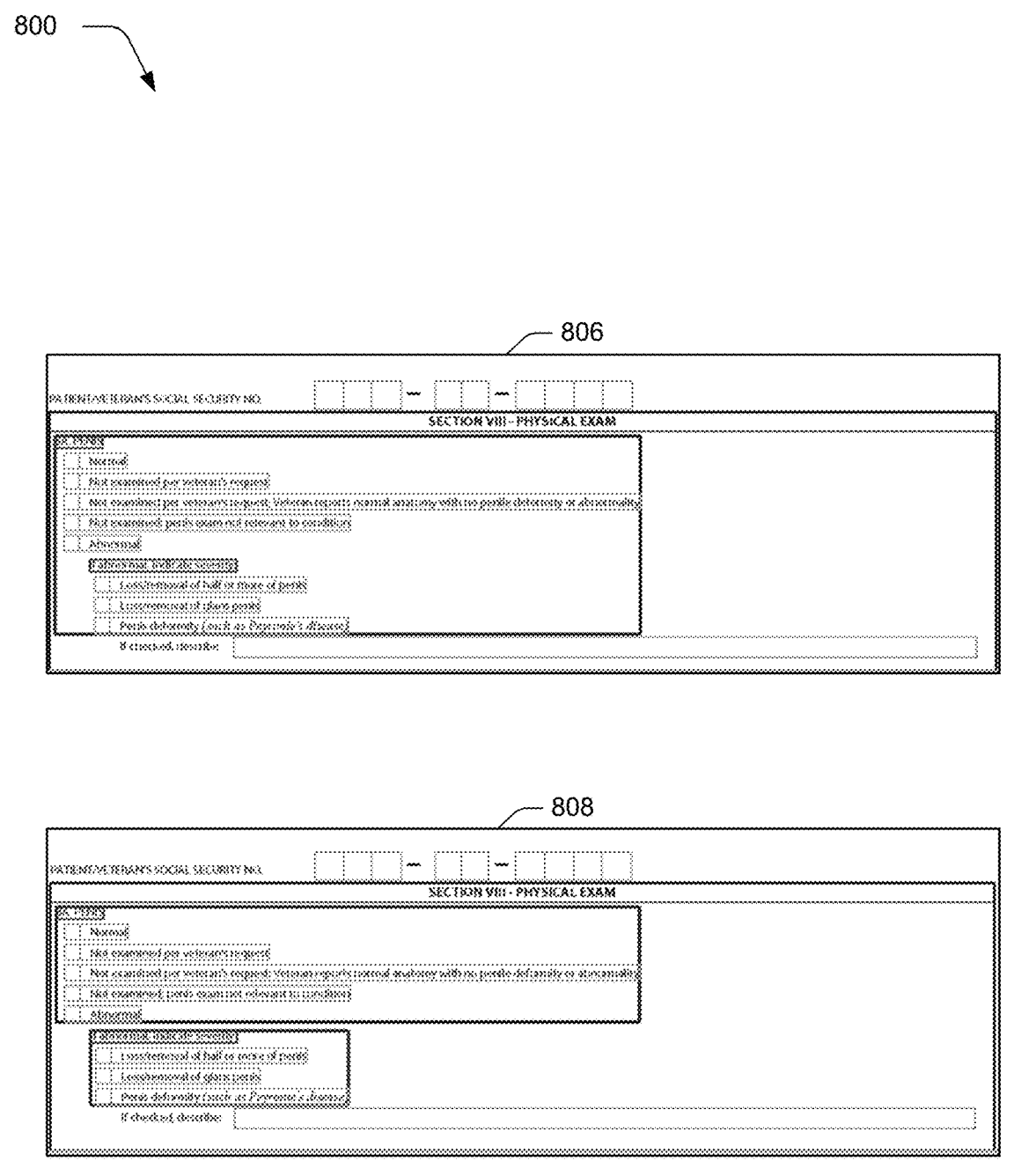
Figure 8B:
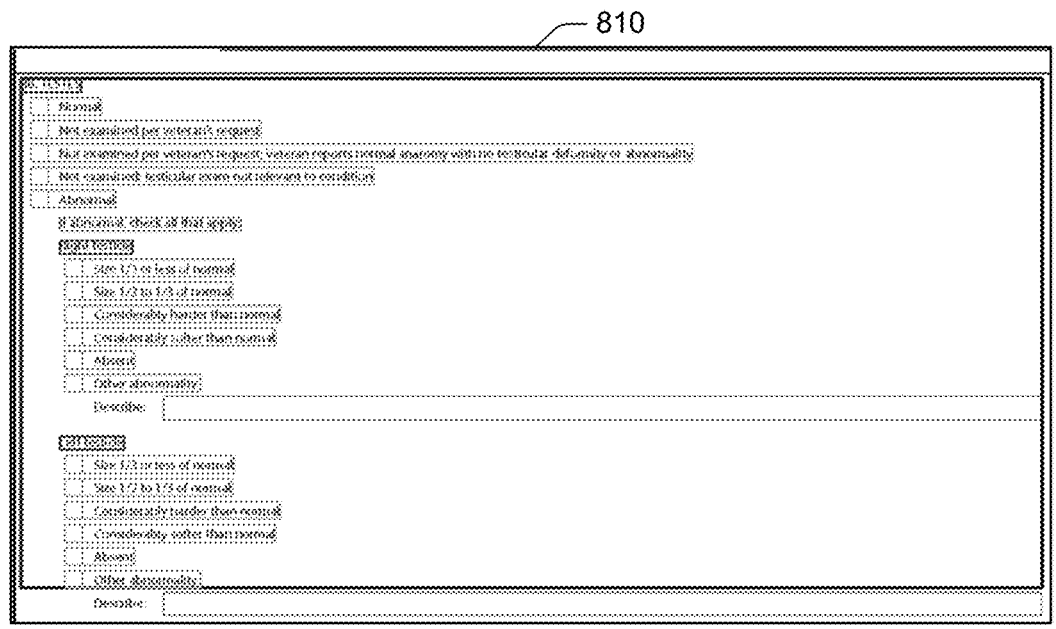
Figure 8B:
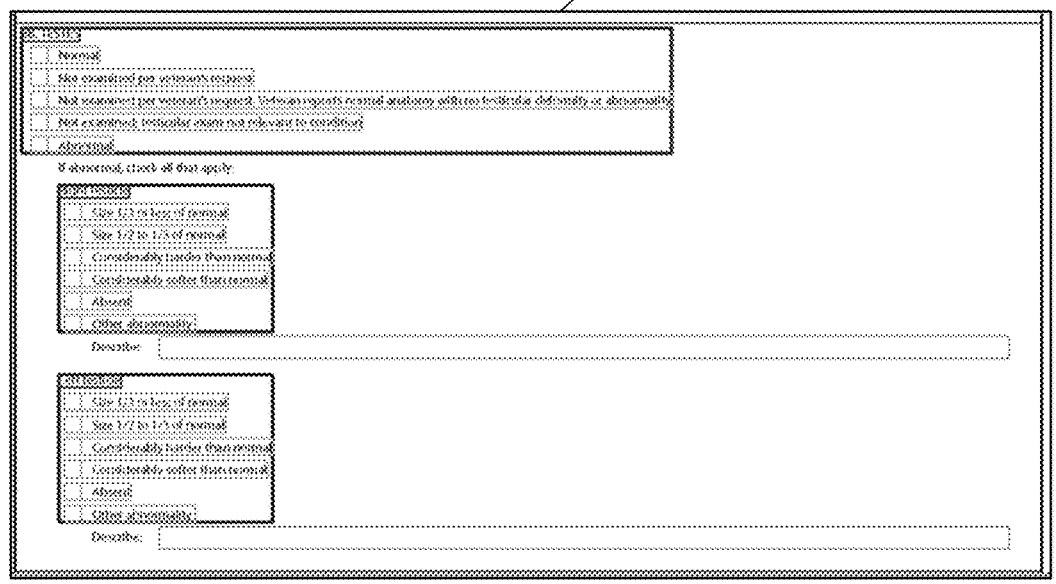
Figure 8C:

FIGS. 8A, 8B, and 8C illustrate examples of structures extracted from forms. FIG. 8A illustrates a first example 800 of first choice groups predictions by the hierarchical convolutional neural network and second choice group predictions by the multimodal network based on the first choice group predictions. FIG. 8B illustrates a second example 802 of first choice groups predictions by the hierarchical convolutional neural network and second choice group predictions by the multimodal network based on the first choice group predictions. FIG. 8C illustrates a third example 804 of first choice groups predictions by the hierarchical convolutional neural network and second choice group predictions by the multimodal network based on the first choice groups predictions.

In the first example 800, first choice group predictions 806 include a single choice group while second choice group predictions 808 based on the first choice group predictions 806 include two choice groups that are nested. In the second example 802, first choice group predictions 810 include a single choice group while second choice group predictions 812 based on the first choice group predictions 810 include three choice groups that are nested. In the third example 804, first choice group predictions 814 include two choice groups while second choice group predictions 816 based on the first choice group predictions 814 include 10 choice groups that are nested and adjacent.

Improvement Examples

Table 1 presents a comparison of performance of the hierarchical convolutional neural network (Baseline) for predicting choice groups included in a form and performance of the described systems (Described) for predicting the choice groups included in the form.

TABLE 1

| Choice Group Prediction | | | | | |
|---|---|---|---|---|---|
| Precision Baseline | Precision Described | Precision Difference | Recall Baseline | Recall Described | Recall Difference |
| 62.15 | 77.58 | +15.43 | 66.95 | 70.52 | +3.57 |

As shown in Table 1 above, the described systems demonstrate a 15.43 percent improvement in precision for predicting choice groups included in forms relative to the hierarchical convolutional neural network. The described systems also demonstrate a 3.57 percent improvement in recall for predicting choice groups included in forms relative to the hierarchical convolutional neural network.

Table 2 precents a comparison of performance of the multimodal network (Original) for predicting choice groups included in a form and performance of the described systems (Described) for predicting the choice groups included in the form.

TABLE 2

| Choice Group Prediction | | | | | |
|---|---|---|---|---|---|
| Precision Original | Precision Described | Precision Difference | Recall Original | Recall Described | Recall Difference |
| 55.93 | 77.58 | +21.65 | 62.07 | 70.52 | +8.45 |

As shown in Table 2 above, the described systems demonstrate a 21.65 percent improvement in precision for predicting choice groups included in forms relative to the multimodal network. The described systems also demonstrate an 8.45 percent improvement in recall for predicting choice groups included in forms relative to the multimodal network. Accordingly, the described systems demonstrate significant improvements relative to both the hierarchical convolutional neural network and the multimodal network.

Example System and Device

Figure 9:
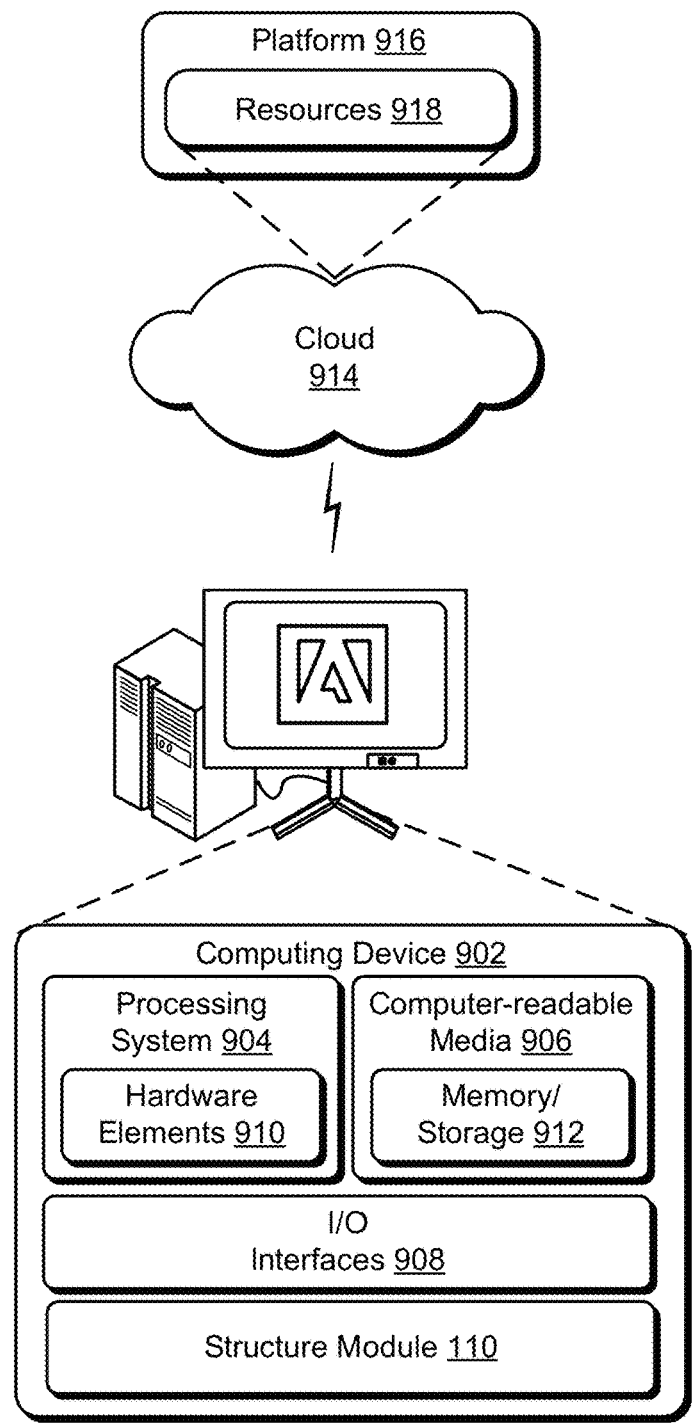
FIG. 9 illustrates an example system that includes an example computing device that is representative of one or more computing systems and/or devices for implementing the various techniques described herein.

FIG. 9 illustrates an example system 900 that includes an example computing device that is representative of one or more computing systems and/or devices that are usable to implement the various techniques described herein. This is illustrated through inclusion of the structure module 110. The computing device 902 includes, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that are configured as processors, functional blocks, and so forth. This includes example implementations in hardware as an application specific integrated circuit or other logic device formed using one or more semiconductors. The hardware elements 910 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 906 is illustrated as including memory/storage 912. The memory/storage 912 represents memory/storage capacity associated with one or more computer-readable media. In one example, the memory/storage 912 includes volatile media (such as random access memory (RAM)) and/or nonvolatile media (such as read only memory (ROM), Flash memory, optical disks, magnetic disks, and so forth). In another example, the memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 902. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 910. For example, the computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing system 904. The instructions and/or functions are executable/operable by one or more articles of manufacture (for example, one or more computing devices 902 and/or processing systems 904) to implement techniques, modules, and examples described herein.

The techniques described herein are supportable by various configurations of the computing device 902 and are not limited to the specific examples of the techniques described herein. This functionality is also implementable entirely or partially through use of a distributed system, such as over a "cloud" 914 as described below.

The cloud 914 includes and/or is representative of a platform 916 for resources 918. The platform 916 abstracts underlying functionality of hardware (e.g., servers) and software resources of the cloud 914. For example, the resources 918 include applications and/or data that are utilized while computer processing is executed on servers that are remote from the computing device 902. In some examples, the resources 918 also include services provided over the Internet and/or through a subscriber network, such as a cellular or Wi-Fi network.

The platform 916 abstracts the resources 918 and functions to connect the computing device 902 with other computing devices. In some examples, the platform 916 also serves to abstract scaling of resources to provide a corresponding level of scale to encountered demand for the resources that are implemented via the platform. Accordingly, in an interconnected device embodiment, implementation of functionality described herein is distributable throughout the system 900. For example, the functionality is implementable in part on the computing device 902 as well as via the platform 916 that abstracts the functionality of the cloud 914.

CONCLUSION

Although implementations of refining element associations for form structure extraction have been described in language specific to structural features and/or methods, it is to be understood that the appended claims are not necessarily limited to the specific features or methods described. Rather, the specific features and methods are disclosed as example implementations of refining element associations for form structure extraction, and other equivalent features and methods are intended to be within the scope of the appended claims. Further, various different examples are described and it is to be appreciated that each described example is implementable independently or in connection with one or more other described examples.

What is claimed is:

1. A method comprising:
    extracting, by an embedding module, an image patch from a digital image depicting a form, the image patch depicting a pair of elements included in the form;
    encoding, by the embedding module, an indication of whether the pair of elements have an association from estimated associations of elements included in the form; and
    generating, by a multimodal module, an indication that the pair of elements have a particular association based at least partially on the encoded indication, bounding boxes of the pair of elements, and text depicted in the image patch.

2. The method as described in claim 1, wherein the particular association is not included in the estimated associations.

3. The method as described in claim 1, wherein the estimated associations of the elements included in the form are generated by processing the digital image using a hierarchical convolutional neural network trained on training data to receive an image depicting an input form as an input and generate indications of associations of elements included in the input form as an output.

4. The method as described in claim 1, wherein the elements included in the form include widgets and text blocks.

5. The method as described in claim 1, wherein the particular association is a choice group included in the form.

6. The method as described in claim 5, wherein the choice group is a nested choice group.

7. The method as described in claim 1, wherein the indication that the pair of elements have the particular association is generated at least partially by processing the image patch using a convolutional encoder.

8. The method as described in claim 1, further comprising generating an indication of an additional element that is included in the form.

9. The method as described in claim 8, wherein the additional element is at least one of text block, a text field, or a choice field.

10. A system comprising:
    a semantic module implemented at least partially in hardware of a computing device to:
        receive input data describing a digital image depicting a form; and
        generate estimate data describing estimated associations of elements included in the form by processing the input data using a hierarchical convolutional neural network trained on training data to receive an image depicting an input form as an input and generate indications of associations of elements included in the input form as an output;
    an embedding module implemented at least partially in the hardware of the computing device to:
        extract an image patch from the digital image, the image patch depicts a pair of elements of the elements included in the form; and
        encode an indication of whether the pair of elements have an association of the estimated associations; and
    a multimodal module implemented at least partially in the hardware of the computing device to generate an indication that the pair of elements have a particular association based at least partially on the encoded indication, bounding boxes of the pair of elements, and text depicted in the image patch.

11. The system as described in claim 10, wherein the particular association is not included in the estimated associations.

12. The system as described in claim 10, wherein the particular association is a choice group that is included in the form.

13. The system as described in claim 12, wherein the choice group is a nested choice group.

14. The system as described in claim 10, wherein the elements included in the form include widgets and text blocks.

15. The system as described in claim 14, wherein the form also includes at least one of a text field, a choice field, or a choice group title.

16. One or more computer-readable storage media comprising instructions stored thereon that, responsive to execution by a computing device, causes the computing device to perform operations including:
receiving input data describing a digital image depicting a form;
generating estimate data describing estimated associations of elements included in the form by processing the input data using a hierarchical convolutional neural network trained on training data to receive an image depicting an input form as an input and generate indications of associations of elements included in the input form as an output;
extracting an image patch from the digital image, the image patch depicts a pair of elements of the elements included in the form;
encoding an indication of whether the pair of elements have an association of the estimated associations; and
generating an indication that the pair of elements have a particular association based at least partially on the encoded indication, bounding boxes of the pair of elements, and text depicted in the image patch.

17. The one or more computer-readable storage media as described in claim 16, wherein the particular association is a choice group included in the form.

18. The one or more computer-readable storage media as described in claim 17, wherein the choice group is a nested choice group.

19. The one or more computer-readable storage media as described in claim 16, wherein the particular association is not included in the estimated associations.

20. The one or more computer-readable storage media as described in claim 16, wherein the elements included in the form include widgets and text blocks.

* * * * *